US007407284B2

(12) United States Patent
Muisener et al.

(10) Patent No.: US 7,407,284 B2
(45) **Date of Patent: *Aug. 5, 2008**

(54) METHODS FOR COATING LENSES

(75) Inventors: Richard Muisener, Tarpon Springs, FL (US); Frederic Chaput, Massy (FR); Herbert Mosse, Lutz, FL (US)

(73) Assignee: Essilor International Compagnie Generale d'Optique, Charenton le Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/554,843

(22) Filed: Oct. 31, 2006

(65) Prior Publication Data

US 2007/0052921 A1 Mar. 8, 2007

Related U.S. Application Data

(63) Continuation of application No. 10/746,140, filed on Dec. 24, 2003, now Pat. No. 7,128,414.

(51) Int. Cl.
*G02C 7/02* (2006.01)

(52) U.S. Cl. ........................ 351/177; 351/163; 351/159

(58) Field of Classification Search .................. 351/177
See application file for complete search history.

(56) References Cited

U.S. PATENT DOCUMENTS

| | | | | |
|---|---|---|---|---|
| 2,400,877 | A | 5/1946 | Dreyer | 359/491 |
| 3,653,741 | A | 4/1972 | Marks | 359/486 |
| 4,211,823 | A | 7/1980 | Suzuki et al. | 428/412 |
| 4,648,925 | A | 3/1987 | Goepfert et al. | 156/153 |
| 4,683,153 | A | 7/1987 | Goepfert et al. | 428/1.31 |
| 4,865,668 | A | 9/1989 | Goepfert et al. | 156/74 |
| 4,977,028 | A | 12/1990 | Goepfert et al. | 428/426 |
| 5,015,523 | A | 5/1991 | Kawashima et al. | 428/336 |
| 5,106,561 | A * | 4/1992 | Singh et al. | 264/165 |
| 5,316,791 | A | 5/1994 | Farber et al. | 427/164 |
| 5,739,296 | A | 4/1998 | Gvon et al. | 534/577 |
| 5,753,301 | A * | 5/1998 | Brytsche et al. | 427/162 |
| 6,049,428 | A | 4/2000 | Khan et al. | 359/491 |
| 6,174,394 | B1 | 1/2001 | Gvon et al. | 156/100 |
| 6,245,399 | B1 | 6/2001 | Sahouani et al. | 428/1.31 |
| 6,250,758 | B1 * | 6/2001 | Yoshihara et al. | 351/163 |
| 6,355,124 | B1 | 3/2002 | Blomberg et al. | 156/99 |
| 7,128,414 | B2 * | 10/2006 | Muisener et al. | 351/177 |
| 2002/0018177 | A1 | 2/2002 | Dillon | 351/163 |
| 2002/0115551 | A1 * | 8/2002 | Hasui | 501/32 |
| 2002/0172893 | A1 | 11/2002 | Kozenkov et al. | 430/321 |
| 2003/0020869 | A1 | 1/2003 | Leclaire et al. | 351/159 |

(Continued)

FOREIGN PATENT DOCUMENTS

| | | |
|---|---|---|
| EP | 0404111 | 12/1990 |

(Continued)

*Primary Examiner*—Jessica T Stultz
(74) *Attorney, Agent, or Firm*—Fulbright & Jaworski L.L.P.

(57) ABSTRACT

Methods of coating at least a portion of a curved surface of a lens with a polarizing liquid. One method includes providing a lens having a curved surface and a lens axis; and rotating the lens about a rotation axis such that a polarizing liquid flows over at least a portion of the curved surface; the rotation axis being offset from the lens axis. Other methods are included. Apparatuses include ophthalmic lenses having polarized coatings formed according to any of the disclosed methods.

22 Claims, 6 Drawing Sheets

U.S. PATENT DOCUMENTS

2003/0164905 A1 9/2003 Yamaoka et al. .............. 349/95
2004/0145700 A1 * 7/2004 Miniutti et al. ............. 351/159

FOREIGN PATENT DOCUMENTS

| | | |
|---|---|---|
| EP | 2001091747 | 4/2001 |
| JP | 63-87223 | 4/1988 |
| JP | 63-141001 | 6/1988 |
| WO | WO 94/10230 | 5/1994 |
| WO | WO 2005/006034 | 1/2005 |

* cited by examiner

METHODS FOR COATING LENSES

CROSS-REFERENCE TO RELATED APPLICATION

This is a continuation of application Ser. No. 10/746,140, filed Dec. 24, 2003, now U.S. Pat. No. 7,128,414, which is incorporated by reference without disclaimer.

BACKGROUND OF THE INVENTION

1. Field of the Invention

The invention relates generally to methods of coating lenses. More particularly, the invention relates to methods of applying polarized coatings to curved lenses.

2. Description of Related Art

Polarized lenses block light of certain polarization states. By blocking horizontally polarized light, a polarized lens reduces glare that would otherwise exist through a non-polarized lens, such as glare off water, roads, and other objects. As a result of the reduced glare, objects become more distinct and true colors more clear. There are currently several different known systems for polarizing lenses for use in eyewear.

a. Film-Based Polarizing Systems

Certain of today's current eyewear products are fabricated by casting polyvinylalcohol-iodine films into a thermoset lens or by insert injection molding of a laminated polarized film to a thermoplastic lens. From a business perspective, these technologies are rigid and usually specific to mass production rather than made-to-order prescription ophthalmic lenses. The final optical properties of the resulting lens are determined by the film and are not easily altered. Additionally, film-based lenses require a separate inventory of polarized products, which can lead to increased costs.

Film-based products suffer from certain performance/technology shortcomings. Although the films have very high polarization efficiencies, the performance of the resulting lens is highly dependent upon the precise placement of the film within the lens. For example, if the polarization axis is not placed within three (3) degrees of the optic axis of a progress lens, the product is not acceptable. Also, a film placed on a progressive lens can greatly limit the final thickness of a wearer's lens due to the film's thickness. Furthermore, the precursor film to the polarization film can have cosmetic impurities/non-uniformities due to the nature of dying the polarization film (also known in the art as stretch films). Such non-uniformity, which can be observed as streaking in the film's coloration, can be exacerbated by the casting process, during which a thermal or chemical attack of the film can lead to dye bleach or further color non-uniformity.

b. Other Polarizing Systems

Example of lenses that have been polarized using a coating rather than film are shown in U.S. Pat. Nos. 4,648,925; 4,683,153; 4,865,668; and 4,977,028, all of which are expressly incorporated by reference. Performance of the methods disclosed in these patents involves rubbing or scratching the lens prior to deposition of the dye used to form the coating. Such a process, commercially, is "dirty" and not readily adaptable or necessarily compatible with all lens materials and curvatures. To orient a dye molecule in these processes, the substrate must be scratched to form grooves of appropriate dimensions, which will in turn create a molecular orientation of the applied die that is favorable to alignment. The overall performance (contrast ratio=40) of such polarized lenses is relatively low. The scratching is also likely to induce some haze in the final product.

U.S. Pat. No. 2,400,877, which is expressly incorporated by reference, discloses treating a substrate in some manner to produce an orientation that will, in turn, properly orient the polarizable materials that are applied to the substrate to form a polarized coating. Rubbing the surface of the substrate is disclosed as the preferred means of creating the appropriate surface orientation, although static electrical and magnetic fields are also disclosed for the same purpose. This patent mentions "spraying, flowing, pouring [and] brushing" as means of applying the disclosed films of polarizing materials to a surface. Dip coating is disclosed as one example of the disclosed application methods. Much of the patent is directed to describing means of fixing the applied polarized material, such as by controlling the evaporation and/or solidification of the film after it has been applied. The patent states that "[a] another object of [the] invention is to provide polarizing films on curved and intricate surfaces and to provide films in any of unlimited colors and color combinations." The patent also recites treating "polarizing filters for optical work of various kinds including photography, binoculars, goggles, windshields, mirrors, etc. . . . [and] lenses corrected for chromatic aberration. . . . " The patent does not suggest spin coating or otherwise coating a surface that is not first treated for orientation in some way. The patent also does not suggest utilizing shear flow alone in coating a surface with a polarizing liquid.

Two systems have recently been proposed to form polarized coatings on flat surfaces using shear. The Optiva systems disclosed in U.S. Pat. Nos. 5,739,296; 6,049,428; and 6,174,394—all of which are expressly incorporated by reference—include a blend of three self-assembling lyotropic liquid crystal dyes that, upon application of shear, orient to form various colored polarizers. These patents mention the use of coating rods, slot-dye (extrusion) coating, coating by capillary forces, and other methods as ways of coating a flat surface with, for example, a polymeric film or glass sheets. Because the orientation of the molecules occurs during the coating process, no surface preparation steps, such as rubbing, are necessary. This reduces the need for a specific alignment layer or reduces the incompatibility of surfaces on which liquid crystalline materials are not likely to align during application. The processes in these patent are suited to web coating a continuous roll of thin, flat polymeric films. They are not suited to use on non-flat surfaces.

U.S. Pat. No. 6,245,399, which is expressly incorporated by reference, discloses a liquid crystal guest-host system that is aligned by shear forces. In this patent, the dye is not directly aligned by the shear flow. Instead, the orientation of the guest dichroic (pleochroic) dye is controlled by the host lyotropic liquid crystal material, which is oriented by shear flow. This patent does not suggest any shear flow application for a non-planar surface.

SUMMARY OF THE INVENTION

The inventors have developed manners in which to apply polarizing liquids to curved surfaces, including those that have not previously been treated to create an orientation for the polarized coating, and thereafter form polarized coatings. A major benefit afforded by the present methods is that polarized coatings may now be created on made-to-order prescription lenses (e.g., ophthalmic lenses) in a short amount of time. As a result, custom lens makers may now create polarized coatings for their customers on demand, without needing to retain a separate inventory of polarized products.

The inventors provide methods of coating curved lenses with polarizing liquids. Certain of the present methods include spinning a plate—which can have any suitable shape, including circular, rectangular, triangular, or the like—on which the polarizing liquid is disposed, such that the polarizing liquid is dispersed over at least a portion of a curved surface of a lens that is fixed in any suitable fashion to the plate, such as by positioning the lens in a notch in the plate. The lens need not be treated to create an orientation on the curved surface prior to the spinning. The axis of the plate and the axis of the lens being coated are not aligned, meaning they are offset, or spaced apart, from each other. The polarizing liquid can flow over the curved surface of the lens in shear as a result of the spinning. The polarizing liquid may then be cured (e.g., by drying) to form a polarized coating on the curved surface.

Prior to the off-centered spinning just described, a preferred option is to apply the polarizing liquid by any conventional means over at least a first portion of the curved surface, preferably the whole curved surface of the lens. This step of applying the polarizing liquid to a first portion of the curved surface of the lens may be implemented in a separate coating apparatus, such as a dip coating apparatus or a spin coating apparatus, before disposing the lens on the plate. In embodiments where the polarizing liquid already has been applied by conventional means to the curved surface of the lens, or a portion of the curved surface, it then is not mandatory to apply the polarizing liquid on the plate before spinning the plate. Once the polarizing liquid has been applied to the curved surface of the lens, and the lens is disposed on the plate, the spinning of the plate will induce the shear flow and the final orientation for obtaining the polarized coating.

Some of the present methods comprise providing a lens having a curved surface and a lens axis; and rotating the lens about a rotation axis that is offset from the lens axis such that a polarizing liquid flows over at least a portion of the curved surface. Preferably the lens axis and the rotation axis are parallel during the rotating. However, the lens may be slightly tilted such that the curved surface is turned toward the rotation axis of the plate, and the lens and rotation axes intersect at an acute angle of no more than 45°, preferably no more than 30°, more preferably no more than 20°, even more preferably no more than 10°, and still more preferably no more than 5°. Prior to such rotating, the lens may be rotated about the lens axis (e.g., in a traditional spin coating manner) such that the polarizing liquid flows over at least a first portion of the curved surface. After such conventional spin coating, one may rotate the lens about the rotation axis such that the polarizing liquid flows over at least a second portion of the curved surface. Those first and second portions may preferably include, or be, the same portion. In such an embodiment, the conventional spin coating may be used to apply a layer of a polarizing liquid over the entire curved surface of the lens. Then, the rotation of the lens about a rotation axis that is offset from the lens axis will induce the shear flow and the final orientation for obtaining the polarized coating. The lens has a radius and a diameter, and the rotation axis may be offset from the lens axis by a distance that is equal to or greater than the radius of the lens, the diameter of the lens, or 1.5 times the radius of the lens. The curved surface may have not been treated to create an orientation prior to the coating. The portion first mentioned may be coated with a material prior to the rotating. The material may include a coupling agent or it may include an adhesion primer layer. The curved surface may be a convex surface, and the lens may have a concave surface substantially opposite the convex surface. The methods may also include placing the lens in a notch positioned in a plate having the rotation axis. A polarized coating may be formed after the rotating (e.g., through curing of the polarizing liquid), and the methods may further include adjusting a dye in the polarizing liquid to customize a color of the polarized coating. The methods may also include placing the polarizing liquid on the plate; and the rotating may comprise rotating the lens about the rotation axis by rotating the plate such that the polarizing liquid flows over at least the portion of the curved surface. The first portion may include the entire curved surface.

Other of the present methods comprise providing a lens having a curved surface; and rotating a polarizing liquid such that the polarizing liquid undergoes shear flow and coats at least a portion of the curved surface. The lens may have an axis, and the rotating may include rotating the lens about the lens axis and flowing the polarizing liquid over at least a first portion of the curved surface (such as may be accomplished using traditional spin coating techniques); and rotating the lens about a rotation axis such that the polarizing liquid undergoes shear flow and coats at least a second portion of the curved surface. The first and second portions may preferably include, or be, the same portion. The curved surface may have not been treated to create an orientation prior to the rotating. The first portion may be coated with a material prior to being coated with the polarizing liquid. The material may include a coupling agent or it may include an adhesion primer layer. The curved surface may be a convex surface, and the lens may have a concave surface substantially opposite the convex surface. A polarized coating may be formed after the rotating and after fixing a die in the polarizing liquid (e.g., through curing of the polarizing liquid), and the method may further include adjusting a dye in the polarizing liquid to customize a color of the polarized coating. The methods may also include placing the lens in a notch positioned in a plate prior to the rotating, the lens having a lens axis and the plate having a rotation axis, the two axes being offset from each other. The lens has a radius and a diameter, and the rotation axis may be offset from the lens axis by a distance that is equal to or greater than the radius of the lens, the diameter of the lens, or 1.5 times the radius of the lens. The methods may further include placing the polarizing liquid on the plate; and the rotating may include rotating the plate about the rotation axis. The portion may include the entire curved surface.

Still other of the present methods include providing a plate having a substantially-centered rotation axis and a lens-receiving structure, preferably a notch; orienting a lens in the notch, the lens having a surface and a lens axis that is not aligned with the rotation axis; placing a polarizing liquid on the plate; and rotating the plate about the rotation axis such that the polarizing liquid covers at least a portion of the surface of the lens; and curing the polarizing liquid to form a polarized coating on the portion, the polarized coating having a contrast ratio of at least 50. The rotating may include rotating the lens about the lens axis such that the polarizing liquid flows over at least a first portion of the curved surface; and rotating the plate about a rotation axis such that the polarizing liquid covers at least a second portion of the curved surface. The first and second portions may include, or be, preferably the same portion. The lens has a radius and a diameter, and the rotation axis may be offset from the lens axis by a distance that is equal to or greater than the radius of the lens, the diameter of the lens, or 1.5 times the radius of the lens. The surface may have not been treated to create an orientation prior to the rotating. The methods may also include adjusting a dye in the coating liquid to customize a color of the polarized coating. The first portion may be coated with a material prior to being covered with the polarizing liquid. The material may include a coupling agent or it may include an adhesion primer layer. The rotating may include rotating the plate about the rotation axis such that the polarizing liquid undergoes shear flow as the coating liquid covers at least the portion of the surface of the lens. The surface may be a convex surface, and the lens may have a concave surface substantially opposite the convex surface. The first portion may include the entire surface of the lens.

The present apparatuses include ophthalmic lens coated with a polarizing liquid according to the steps of any of the present methods. Some of the present apparatuses also comprise an ophthalmic lens having a convex surface; and a polarized coating disposed on the convex surface, the polarized coating including a material that forms a polarized coating following shear flow of the material over the convex surface. The polarized coating may include lyotropic liquid crystal material.

Other of the present apparatuses comprise an ophthalmic lens having a convex surface; one or more layers disposed on the convex surface; and a polarized coating disposed on the one or more layers, the polarized coating including a material that forms a polarized coating following shear flow of the material over the one or more layers. The polarized coating may include lyotropic liquid crystal material. The one or more layers may include a coupling agent. The one or more layers may include at least one adhesion primer layer.

Additional embodiments of the present methods and apparatuses, and details associated with those embodiments, are set forth below.

BRIEF DESCRIPTION OF THE DRAWINGS

The following drawings demonstrate certain aspects of the present methods. The drawings illustrate by way of example and not limitation, and they use like references to indicate similar, although not necessarily identical, elements.

DESCRIPTION OF ILLUSTRATIVE EMBODIMENTS

The terms "comprise" (and any form of comprise, such as "comprises" and "comprising"), "have" (and any form of have, such as "has" and "having"), and "include" (and any form of include, such as "includes" and "including") are open-ended linking verbs. As a result, a method, or a step in a method, that "comprises," "has," or "includes" one or more steps or elements possesses those one or more steps or elements, but is not limited to possessing only those one or more steps or elements.

Thus, and by way of example, a method "comprising" providing a lens having a curved surface and a lens axis, and rotating the lens about a rotation axis that is offset from the lens axis such that a polarizing liquid flows over at least a portion of the curved surface has, but is not limited to having only, the recited steps. That is, the method possesses at least the recited steps, but does not exclude other steps that are not expressly recited. For example, the method also covers placing the lens in a notch positioned in a plate. Likewise, the rotating step also covers rotation that results in the polarizing liquid flowing over the entire curved surface.

Figure 1:
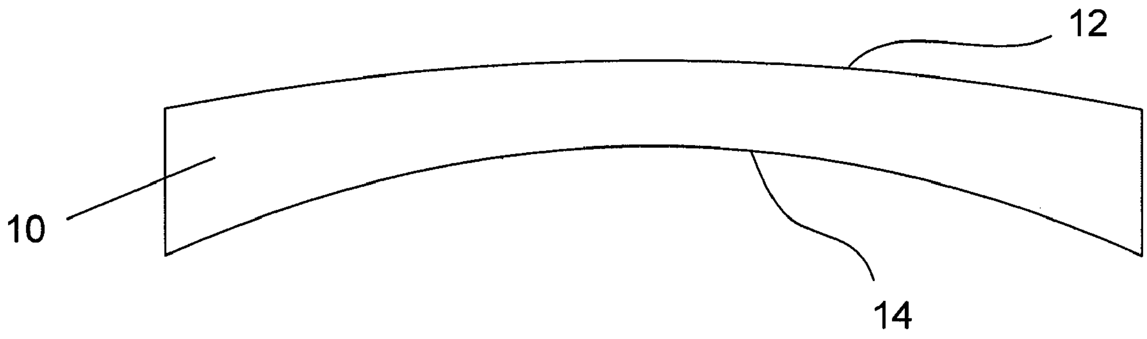
FIG. 1 is side view of lens having a curved surface.

FIG. 1 is an edge view of a lens that can be coated consistently with the present methods. Lens 10 includes curved surface 12 (which is a convex surface) and curved surface 14 (which is a concave surface), the two curved surfaces being oriented substantially opposite one another. The term "substantially" means at least approaching a given state (e.g., preferably within 10% of, more preferably within 1% of, even more preferably within 0.5% of, and most preferably identical to the given state).

Figure 2:
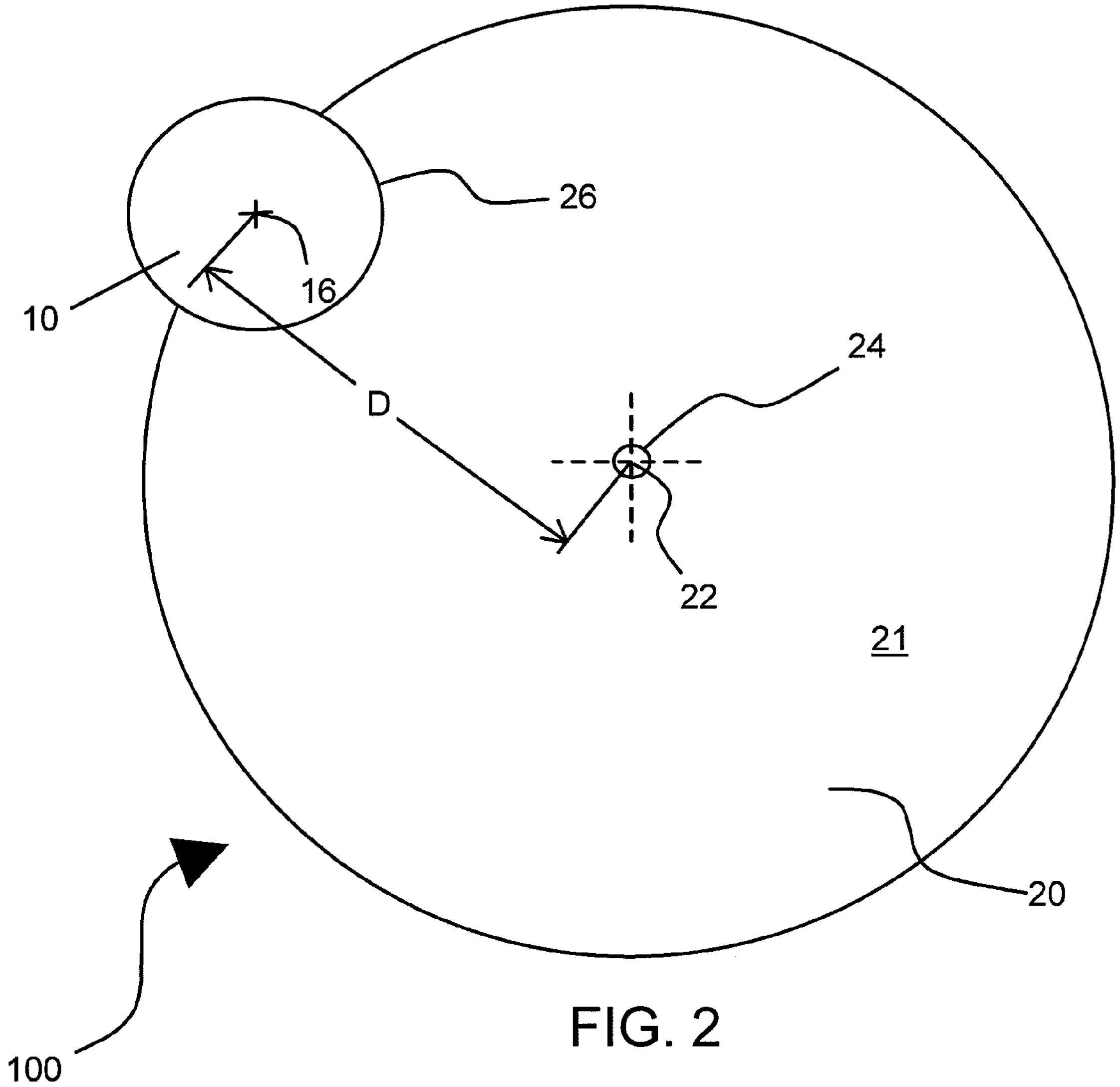
FIG. 2 is one version of a setup that can be used to coat a curved surface of a lens with a polarizing liquid consistent with the present methods.
Figure 3:
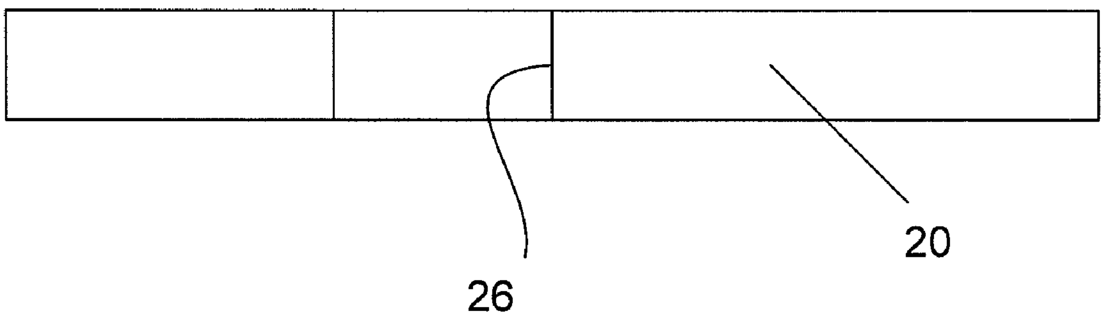
FIG. 3 shows one suitable notch that may be placed in the plate shown in FIG. 2.
Figure 4:
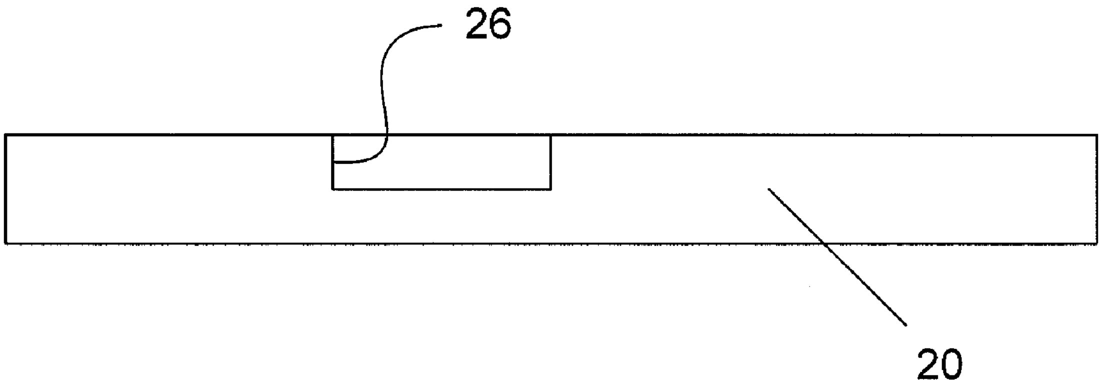
FIG. 4 shown another suitable notch that may be placed in the plate shown in FIG. 2.

FIG. 2 shows a setup that may be used to accomplish the present methods. Setup 100 includes a plate 20, which is shown as being substantially circular. Plate 20 includes a top surface 21 and an axis 22 that is positioned substantially at its center. Plate 20 also includes an opening 24, positioned substantially at the center, that serves to configure the plate for use with, for example, a spin coating motor. Plate 20 includes a notch 26, in which lens 10 is placed, with curved surface 12 exposed. Notch 26 may extend through plate 20, as shown in FIG. 3, or it may extend only partially into the thickness of plate 20, as shown in FIG. 4. Preferably, curved surface 12 of lens 10 is positioned substantially flush with top surface 21 of plate 20.

Lens 10 is shown as having an axis 16 that is positioned substantially at its center. As FIG. 2 shows, the axes of plate 20 (which may be described as a rotation axis) and lens 10 (which may be described as a lens axis) separated by a distance D, meaning the two axes are not aligned. Offsetting the axes furthers the likelihood that the polarizing liquid will flow in shear across curved surface 12 of lens 10. In one embodiment, distance D is preferably equal to or greater than the radius of lens 10, more preferably equal to or greater than the diameter of lens 10, and even more preferably equal to or greater than 1.5 times the radius of lens 10.

Lens 10 may be held in place in notch 26 using any suitable means, including by adhesive, one or more vacuum suction cups, one or more spring-loaded clamps, or an interlocking collar between the lens and the plate; other suitable means known to those skilled in the art may also be used. Alternatively and/or additionally, notch 26 may be oriented in plate 20 such that axis 16 of lens 10 is inside of what would otherwise be the perimeter of plate 20 (note the dashed line representing what would otherwise be the edge of plate 20 in FIG. 2).

Plate 20 can be made from any suitable material, including a polymer (e.g., plastic), a metal (e.g., aluminum), and the like. Lens 10 may be an ophthalmic lens made from any suitable material, including glass, regular plastic, and polycarbonate.

Figure 5:
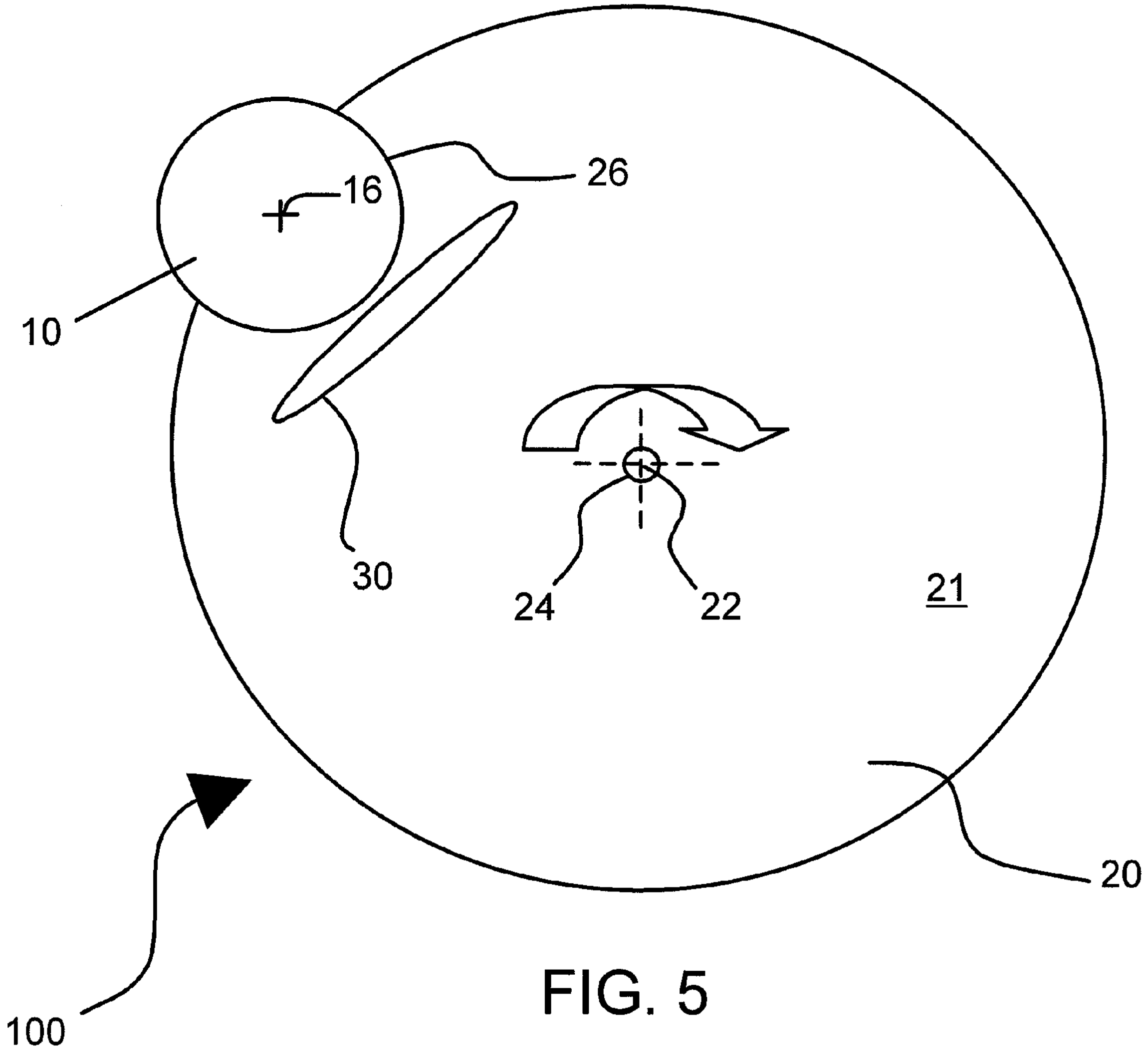
FIG. 5 shows a generic representation of a polarizing liquid placed on the plate in the setup shown in FIG. 2.
Figure 6:
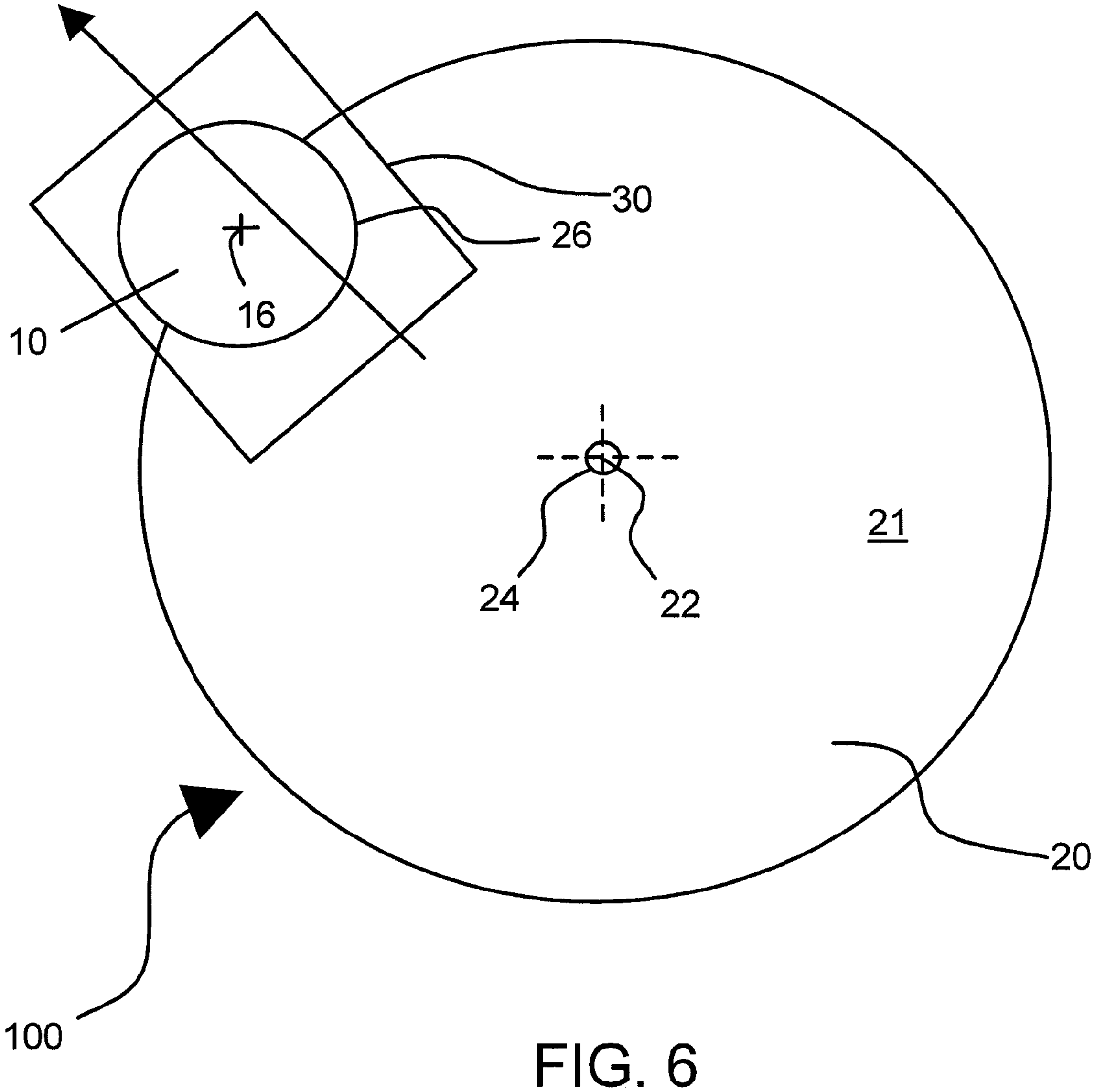
FIG. 6 shows a generic representation of the direction of flow of the polarizing liquid shown in FIG. 5 as a result of spinning the plate. This figure also shows a generic representation of the coating that results from the spinning.

FIG. 5 shows polarizing liquid 30, which has been placed on plate 20 of setup 100. The position where polarizing liquid 30 is placed should be such that the liquid flows over the desired portion of lens 10 without "running out" prior to coating that portion. After securing plate 20 to a rotating mechanism, such as a conventional spin coating motor, lens 10 may be rotated (as indicated by the arrow in FIG. 5) about rotation axis 22 such that polarizing liquid 30 flows over at least a portion (and preferably the entirety) of curved surface 12 of lens 10. This rotation may also be described as rotating polarizing liquid 30. Curved surface 12 need not first be treated (e.g., by rubbing or the like) to create an orientation that will facilitate the alignment of the molecules in polarizing liquid 30 as it flows over curved surface 12. However, such treatment is within the scope of certain of the present methods. FIG. 6 shows a generic representation of the result of rotating lens 10 in this fashion. The arrow in FIG. 6 represents the direction of the shear flow of polarizing liquid 30 as a result of the rotating and the offset axes 16 and 22.

Preferably, lens axis 16 and rotation axis 22 are parallel during the rotating of the lens 10 about rotation axis 22. However, lens 10 may be slightly tilted so that curved surface 12 is turned toward the rotation axis of plate 20. In this regard, lens axis 16 preferably is tilted such lens axis 16 intersects rotation axis 22 at an acute angle of no more than 45°, preferably no more than 30°, more preferably no more than 20°, even more preferably no more than 10°, and still more preferably no more than 5°.

A "polarizing liquid" is any solution configured to form a polarized coating at some time after application to a lens. Polarizing liquids include, but are not limited to, polarizing systems known to form a polarized coating as a result of shear flow of the liquid over a surface. Examples of suitable polarizing liquids include lyotropic liquid crystal materials, such as those disclosed in U.S. Pat. No. 6,049,428, in which the liquid crystal can be the active dye or a host in a guest-host system. One suitable polarizing liquid may be an aqueous suspension of dyes in which the color of the resulting polarized coating can be easily adjusted.

A polarized coating that may be described as a thin crystal film (TCF) polarized coating can be formed as follows. Existing dichroic dyes, that are also lyotropic liquid crystals, may be chemically modified by sulfonation. This modification will render the dye molecules amphiphilic. Both the amphiphilic nature and flat geometry of the dye molecules will lead to a self assembly, or stacking, of the dye molecules in solution, which may also be described as the polarizing liquid. The concentration of the solution will influence the structure of the resulting coating based upon the material's liquid crystal phase diagram.

The solution may be applied to a surface and sheared. The dye molecules will be aggregates in solution that will easily align through cooperative motion upon application of shear. The solution may then be cured to yield a polarized coating by drying the solution in a controlled manner. By this, the inventors mean that if the solution is dried too quickly, the water in the solution would effectively boil off, thus disrupting the structure of any resulting coating. In this same regard, if the solution is dried too slowly, the molecules in the solution that otherwise exist at a concentration and temperature range will experience an undesirable concentration change. If a moderate pace of drying is used, the orientation of the molecules in the solution will be locked in, and the molecules will not have time to reorganize into a different orientation. Exemplary drying conditions suitable for use in performance of the present methods are provided below in the examples. After such drying, the polarized coating may be set by making an insoluble salt.

TCF polarizing liquids (which form TCF polarized coatings and which may be referred to as TCF polarizers) offer advantages over polyvinylalcohol (PVOH) or PVOH-clad polarizers, including advantages in the following categories: haze: because a TCF polarizer is a single component, unlike a dispersed dye in a polymer, there is little or no scattering of light; viewing angle: in liquid crystal display (LCD) applications, TCF polarizers provide wider viewing angles than conventional polarizers. This aspect may be particularly useful in sunwear applications; thickness: TCF polarized coatings can be less than a micron in thickness, versus clad polarized coatings, which are typically at least 0.2 millimeters (mm) in thickness; and temperature stability: unlike conventional iodine/PVOH polarized coatings, TCF polarized coatings are stable in high humidity and temperatures exceeding 200° C. TCF polarizers may also be customized by color to best suit a given application.

The result of the steps just described—e.g., providing a lens having a curved surface; placing the lens in a notch in a plate having an axis offset from the axis of the lens; and coating a portion (and preferably the entirety) of the curved surface of the lens by spinning the plate and, thus, the polarizing liquid—is a polarized lens formed from a polarizing liquid that is capable of linear orientation under shear flow. The spinning and offset axes together provide a suitable means of inducing shear flow (e.g., through a linear shear field) across at least a portion of (and more preferably the entirety of) the exposed surface of the subject lens. Any dye(s) in the polarizing liquid can be adjusted to customize the color of the polarized coating. A polarized coating thickness of between 300 and 5000 nanometers (nm) may be produced using 2-3 milliliters (mL) of polarizing liquid for a lens that is approximately 70 millimeters (mm) in diameter.

Prior to the spin coating of the polarizing liquid, one or more adhesion primer layers, which may comprise one or more coupling agents, may be deposited on the curved surface (or the portion of the curved surface) of the lens that is coated with the polarizing liquid as detailed above. Thus, all descriptions of coating a lens or a portion of lens by spinning a polarizing liquid encompass coating both the lens surface directly (e.g., no intervening coating between the lens surface and the polarizing liquid) and indirectly (e.g., an intervening coating—such as an adhesion layer—exists between the lens surface and the polarizing liquid).

A primer coating that is used for adhesion also may be used for improving the impact resistance of a finished optical article. Typical primer coatings are (meth)acrylic based coatings and polyurethane based coatings. (Meth)acrylic based coatings are, among others, disclosed in U.S. Pat. No. 5,015,523 (which is expressly incorporated by reference), whereas thermoplastic and crosslinked based polyurethane resin coatings are disclosed, inter alia, in Japanese Patents 63-141001 and 63-87223, EP 0 404 111, and U.S. Pat. No. 5,316,791 (which is expressly incorporated by reference).

In particular, a primer coating suited for use with embodiments of the present methods can be made from a latex composition such as a poly(meth)acrylic latex, a polyurethane latex or a polyester latex. Among the preferred (meth) acrylic based primer coating compositions are polyethyleneglycol(meth)acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof.

Preferably, a primer coating suited for use with the present methods has a glass transition temperature (Tg) of less than 30° C.

Among the preferred primer coating compositions are the acrylic latex commercialized under the name ACRYLIC LATEX A-639 (commercialized by ZENECA) and polyurethane latex commercialized under the names of W-240 and W-234 by BAXENDEN.

In a preferred embodiment, a suitable primer coating also may include an effective amount of a coupling agent in order to promote adhesion of the primer coating to the optical substrate and/or to the polarizing layer.

A primer coating composition can be applied using any classical method such as spin, dip, or flow coating. Depending upon the nature of the adhesive and impact-resistant primer coating composition, thermal curing, UV-curing or a combination of both can be used to cure the coating.

The thickness of a primer coating useful with the present methods, after curing, typically ranges from 0.05 to 20 micrometers (μm), preferably 0.5 to 10 μm and more preferably from 0.6 to 6 μm.

A suitable coupling agent may be a pre-condensed solution of an epoxyalkoxysilane and an unsatured alkoxysilane, preferably comprising a terminal ethylenic double bond. Examples of epoxyalkoxysilanes are γ-glycidoxypropyltermethoxysilane, γ-glycidoxypropylpentamethyldisiloxane, γ-glycidoxypropylmethyldiisopropenoxysilane, (γ-glycidoxypropyl)-methyldiethoxysilane, γ-glycidoxypropylmethylethoxysilane, γ-glycidoxypropyldiisopropylethoxysilane and (γ-glycidoxypropyl) bis(trimethylsiloxy)methylsilane. The preferred epoxyalkoxysilane is (γ-glycidoxypropyl)trimethoxysilane.

The unsatured alkoxysilane can be a vinylsilane, an allylsilane, an acrylic silane or a methacrylic silane. Examples of vinylsilanes are vinyltri(2-methoxyethoxy)silane, vinyltrisisobutoxysilane, vinyltri-t-butoxysilane, vinyltriphenoxysilane, vinyltrimethoxysilane, vinyltriisopropoxysilane, vinyltriethoxysilane, vinyltriacetoxysilane, vinylmethyldiethoxysilane, vinylmethyldiacetoxysilane, vinylbis(trimethylsiloxy)silane and vinyldimethoxyethoxysilane. Examples of allylsilanes are allyltrimethoxysilane, alkyltriethoxysilane and allyltris(trimethylsiloxy)silane.

Examples of acrylic silanes are 3-acryloxypropyltris(trimethylsiloxy)silane, 3-acryloxypropyltrimethoxysilane, acryloxypropylmethyldimethoxysilane, 3-acryloxypropylmethylbis (trimethylsiloxy)silane, 3-acryloxypropyldimethylmethoxysilane, -(3-acryloxy-2-hydroxypropyl)-3-aminopropyltriethoxysilane.

Examples of methacrylic silanes are 3-methacryloxypropyltris (vinyldimethoxysiloxy)silane, 3-methacryloxypropyltris(trimethylsiloxy)silane, 3-methacryloxypropyltris (methoxyethoxy)silane, 3-metacryloxypropyltrimethoxysilane, 3-methacryloxypropylpentamethyl disiloxane, 3-methacryloxypropylmethyldimethoxysilane, 3-methacryloxpropylmethyldiethoxysilane, 3-methacryloxypropyldimethyl methoxysilane, 3-methacryloxypropyldimethylethoxysilane, 3-methacryloxypropenyltrimethoxysilane and 3-methacryloxypropylbis(trimethylsiloxy)methylsilane.

The preferred silane is acryloxypropyltrimethoxysilane.

Preferably, the amounts of epoxyalkoxysilane(s) and unsaturated alkoxysiolane(s) used for a coupling agent preparation are such that the weight ratio:

$$R = \frac{\text{weight of epoxyalkoxysilane}}{\text{weight of unsaturated alkoxysilane}}$$

verifies the condition $0.8 \leq R \leq 1.2$.

A suitable coupling agent preferably comprises at least 50% by weight of solid material from the epoxyalkoxysilane(s) and unsaturated alkoxysilane(s) and more preferably at least 60% by weight. A suitable coupling agent preferably comprises less than 40% by weight of liquid water and/or organic solvent, more preferably less than 35% by weight.

The expression "weight of solid material from the epoxyalkoxysilanes and unsaturated alkoxysilanes" means the theoretical dry extract from those silanes that is the calculated weight of unit $Q_k$ Si $O_{(4-K)/2}$, where:

$Q_k$ Si $O_{(4-K)/2}$ comes from $Q_k$ Si $R'O_{(4-k)}$;

Si R' reacts to form Si OH on hydrolysis;

K is an integer from 1 to 3 and is preferably equal to 1; and

R' is preferably an alkoxy group such as $OCH_3$.

The water and organic solvents referred to above come from those that have been initially added in the coupling agent composition and the water and alcohol resulting from the hydrolysis and condensation of the alkoxysilanes present in the coupling agent composition. Typically, the amount of coupling agent introduced in the primer coating composition represents 0.1 to 15% by weight of the total composition weight, preferably 1 to 10% by weight.

Preferred preparation methods for the coupling agent comprise: mixing the alkoxysilanes; hydrolysing the alkoxysilanes, preferably by addition of an acid, such as hydrochloric acid; stirring the mixture; optionally adding an organic solvent; adding one or several catalyst(s) such as aluminum acetylacetonate; and stirring (typical duration: overnight).

Furthermore, additional coatings—such as primer coatings and/or hard coatings—may be applied to a given lens on top of a polarized coating, provided that the different coatings are chemically compatible.

Preferred scratch-resistant coatings are those made by curing a precursor composition including epoxyalkoxysilanes or a hydrolyzate thereof and a curing catalyst. Preferably the scratch resistant coatings contain at least one inorganic filler such as $SiO_2$ and/or metal oxides colloids. Examples of such compositions are disclosed in U.S. Pat. No. 4,211,823 (which is expressly incorporated by reference), WO 94/10230, and U.S. Pat. No. 5,015,523.

The most preferred scratch-resistant coating compositions are those comprising as the main constituents an epoxyalkoxysilane such as, for example, γ-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remainder of the composition being essentially comprised of solvents typically used for formulating these compositions. Suitable scratch-resistant coating compositions also may contain a coupling agent as described above.

For certain of the present methods, because the surface being coated is untouched by abrasives that could otherwise be used to create an orientation prior to applying the polarized coating, any visual haze that is experienced by a user of such a polarized lens should be less severe than it would be with a polarized lens that was scratched in some manner prior to the application of the polarized coating. Shear flow of the polarizing liquid across the curved lens surface should also reduce edge-effects as compared to other coating methods.

Before rotating plate 20 on which lens 10 is disposed to cause polarizing liquid 30 to flow in shear, a preferred option is to apply polarizing liquid 30 by any conventional means over at least a first portion of curved surface 12, preferably the whole curved surface of the lens. Suitable conventional means for applying the polarizing liquid include dip coating, spray coating, flow coating and spin coating. This step of applying the polarizing liquid to a first portion of the curved surface of the lens may be implemented in a separate coating apparatus, such as a dip coating apparatus or a spin coating apparatus, before disposing the lens on the plate. Lens 10 may be rotated about lens axis 16 during the application of the polarizing liquid in this fashion, and the polarizing liquid may be placed along a radius of the lens as that rotation is occurring.

In embodiments where the polarizing liquid already has been applied by conventional means to the curved surface of the lens, or a portion of the curved surface, it is then not mandatory to apply the polarizing liquid on the plate—as shown in FIG. 5—before spinning the plate. Once the polarizing liquid has been applied to the curved surface of the lens, and the lens is disposed on the plate, the spinning of the plate will induce the shear flow and the final orientation for obtaining the polarized coating.

The following examples are included to demonstrate specific, non-limiting embodiments of the present methods. It should be appreciated by those of skill in the art that the techniques disclosed in the following examples represent techniques discovered by the inventors to function in the practice of certain methods of the invention, and thus constitute modes for its practice. However, those of skill in the art should, in light of this disclosure, appreciate that changes can be made to the techniques and materials of the following examples and still obtain like or similar results without departing from the scope of the invention.

EXAMPLE 1

A substantially circular plastic plate with a diameter of 220 mm was prepared with a notch having a 30 mm in radius located in the edge of the plate. The plate and notch were prepared consistently with setup 100 shown in FIG. 2. A finished single vision 6 base ORMA plano lens (available from Essilor International, and containing diethylene glycol bis(allyl carbonate)) having a convex surface and a substantially opposite concave surface was corona treated using a Model BD-20 handheld unit (Electro Technic Products, Inc., Chicago, Ill.) for approximately 15 seconds to promote adhesion and then placed in the notch (created consistently with the version of notch 26 shown in FIG. 4). The lens was held to the plate using adhesive tape positioned between the concave surface of the lens and the bottom portion of the notch.

The polarizing liquid used was Optiva's TCF NO15 solution, which is an aqueous dispersion of three self-assembling lyotropic dyes; upon coating, the combination of dyes provided a neutral grey color. Approximately 2 to 3 mL of that polarizing liquid was placed on the plate. The plate was affixed to a conventional spin coating motor and accelerated quickly to 2000 revolutions per minute (rpm). The rotating lasted for approximately 15 seconds, and the entire convex surface of the lens was coated with the polarizing liquid. The rotating occurred at room temperature (21° C. in this case) and at a relative humidity of approximately 60 percent. A recommended temperature range during which spinning takes places is 15 to 29° C. Humidities between 50-80% are desirable. However, suitable drying may be accomplished after spinning has taken place at a humidity below 50% and while the humidity remains at below 50%. The dye(s) in the polarizing liquid should be in their nematic phase during the spinning.

After the rotating, the coated lens remained in the same room (as was used during the coating process) and sat for one to two minutes at 21° C. and 60 percent relative humidity to dry and, thus, cure. The higher the humidity in which the solution was dried to form a polarized coating, the longer it takes for the solution to dry. The drying time is directly proportional to the relative humidity. The lens was then immersed in a 10% barium chloride aqueous solution to fix the dye in the polarizing liquid. An acrylic protective coating was placed on the lens for handling and display.

This process was repeated in the same way for a total of 4 of the same lenses. "Contrast ratio" is the ratio of luminous transmittance between parallel and perpendicular positions. Transmission measurements for each of the 4 lenses were performed on a Lamda 900 spectrometer (PerkinElmer, Inc., 44370 Christy Street Fremont, Calif. 94538-3180, USA). For these lenses, transmission measurements were taken at a wavelength of 550 nanometers (nm). Specifically, the perpendicular position for each lens was found by rotating the lens with resect to the reference polarizer until a minimum transmission was observed at 550 nm. Another transmission measurement was taken after rotating the lens 90 degrees. Based on those measurements, the lenses each exhibited a contrast ratio of 100 or more. The contrast ratios as 550 nm were: 100, 115, 127, and 139.

As described below, contrast ratios may also be determined using the referenced Lamda 900 spectrometer in a spectral range of 380-780 nm using a reference polarizer in the beam path. The photopic response may be calculated based upon the full spectral scan. The perpendicular position for a given lens may be found by rotating the lens with resect to a reference polarizer until a minimum transmission is observed at 550 nm. A full spectral scan may be performed at this position and upon rotating the lens 90 degrees.

EXAMPLE 2

Figure 7:
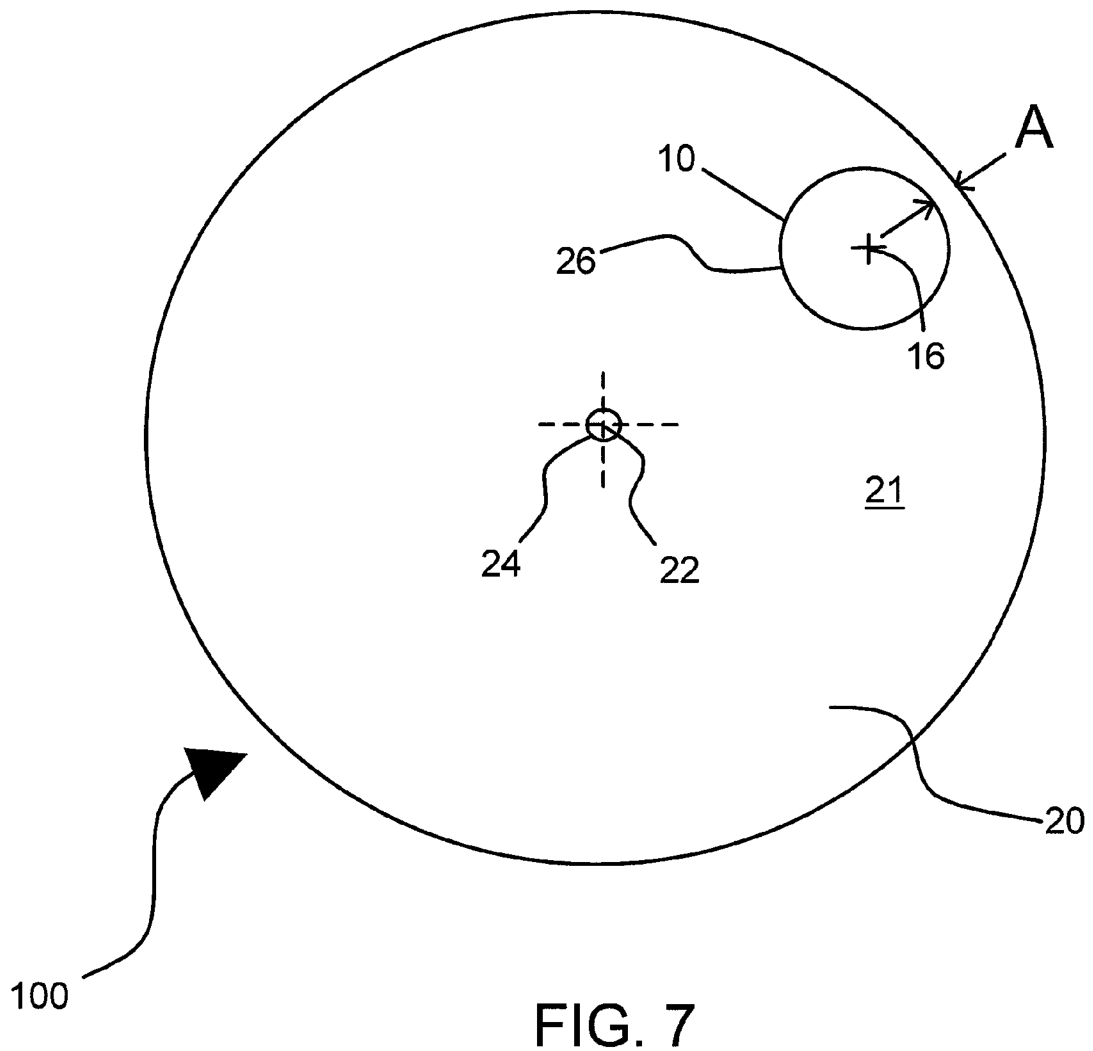
FIG. 7 shows a generic representation of a lens position in the notch of a plate used to arrive at results presented in certain of the present examples.

A substantially circular plastic plate with a diameter of 14 inches was prepared with a notch (which, in this case, was shaped like a complete circle) having a diameter of 70 mm. A generic representation of the plate used in shown in FIG. 7. The notch was positioned entirely inside the plate, as shown in FIG. 7. Specifically, the notch was made by piercing a circular hole having a 60 millimeter (mm) all the way through the plate, and further increasing the size of the hole by circularly removing material only in its upper part to reach a diameter of 70 mm through a depth of 3 mm from the top surface of the plate. The notch thus comprises in its upper part an annular recess (70 mm diameter) and in its lower part an annular flange (60 mm diameter) on which the lens was supported at the lens periphery.

The same lenses were used in this example as were used in Example 1; the same corona treatment was applied to those lenses; and the same amount of the same polarizing liquid was used. The plate was affixed to a conventional spin coating motor—a model 1-PM-101DT-R790 from Headway Research, Inc. (Garland, Tex.). After placement of the polarizing liquid on the plate, the plate was accelerated quickly to the speeds given in Table 1 below. The rotating lasted for approximately 15 seconds, and the entire convex surface of the lens was coated with the polarizing liquid. The rotating occurred at 21° C. and at a relative humidity of approximately 60%.

After the rotating, the coated lens sat at the same temperature and humidity to dry. The lens was then immersed in a 10% barium chloride aqueous solution to fix the dye in the polarizing liquid. An acrylic protective coating was placed on the lens for handling and display.

This process was repeated in the same way for four of the same lenses. The results are reported below in Table 1. The contrast ratios listed in the table were measured using the Lamda 900 spectrometer in a spectral range of 380-780 nm using a reference polarizer in the beam path. The photopic response for each lens was calculated based upon the full spectral scan. The perpendicular position for each lens was found by rotating the lens with resect to a reference polarizer until a minimum transmission was observed at 550 nm. A full spectral scan was performed at this position and upon rotating the lens 90 degrees.

TABLE 1

| Sample | Top Spin Speed (rpm) | Contrast Ratio |
|---|---|---|
| 1 | 2000 | 25.48 |
| 2 | 1900 | 46.66 |
| 3 | 1700 | 50.49 |
| 4 | 1600 | 52.48 |

EXAMPLE 3

The inventors have discovered that conventional spin coating may be employed in combination with the off-centered spin coating described in this disclosure to yield suitable polarized coatings on lenses. In this example, the same types of lenses used for Examples 1 and 2 were first placed on the Headway Research, Inc. spin coating machine referenced above and rotated about their own axes at the rates and times listed below in Table 2. The rotating occurred at 21° C. and at a relative humidity of approximately 60%. The same polarizing liquid used for Examples 1 and 2 was used for the lenses in this example.

Following the traditional spin coating, and while the polarizing liquid was still wet, the lenses were placed on the plate used for Example 2 and rotated at the rates and for the times provided below in Table 2. The coated lenses then sat at 21° C. and a relative humidity of approximately 60% to dry. The lenses were then immersed in a 10% barium chloride aqueous solution to fix the dye in the polarizing liquid. An acrylic protective coating was placed on each lens for handling and display.

Contrast ratios for each of the resulting lenses were obtained in the manner provided above in Example 2.

TABLE 2

| Sample | Center Spin Speed (rpm) | Center Spin Time (sec) | Off-Axis Spin Speed (rpm) | Off-Axis Spin Time (sec) | Contrast Ratio |
|---|---|---|---|---|---|
| 1 | 900 | 2 | 2000 | 1 | 61.95 |
| 2 | 600 | 2 | 1000 | 10 | 89.85 |
| 3 | 800 | 2 | 1800 | 2 | 47.34 |
| 4 | 600 | 2 | 1800 | 2 | 268.59 |
| 5 | 1000 | 1 | 1400 | 1 | 76.08 |
| 6 | 600 | 10 | 1400 | 1 | 36.7 |
| 7 | 600 | 1 | 1600 | 1 | 123.34 |
| 8 | 700 | 1 | 1600 | 1 | 109.52 |
| 9 | 700 | 1 | 1600 | 3 | 51.86 |
| 10 | 700 | 2 | 1400 | 3 | 70.03 |
| 11 | 600 | 2 | 1600 | 3 | 36.18 |

The result of the initial, traditional spin coating was the production of a thin film of polarizing liquid that coated at least a portion of the top surface of each lens, and more specifically the whole surface. The subsequent rotation of each such lens, where the lens axis was offset from the rotation axis of the plate, served to orient the molecules in the polarizing ng liquid and, in some instances, thinned the coating. Such subsequent rotation orients the molecules—such that a polarized coating results—by shear flow. In future applications, such shear flow will remain possible where the traditional spin coating leaves the polarizing liquid with sufficient flowability, which should be realized, for example, where the traditional spin coating is not carried out in a manner that causes the polarizing liquid to gel. Care should be taken to avoid evaporating all of the solvent in the polarizing liquid during the traditional spin coating and thereafter quickly rotating the lens in the de-centered fashion described above.

It should be understood that the present methods and apparatuses are not intended to be limited to the particular forms disclosed. Rather, they are to cover all modifications, equivalents, and alternatives falling within the scope of the claims. For example, while polarized coatings having contrast ratios of about 25 and higher have been described, suitable polarized coatings formed according to the present methods may have contrast ratios as low as 8 (according to ISO 8980-3). The claims are not to be interpreted as including means-plus- or step-plus-function limitations, unless such a limitation is explicitly recited in a given claim using the phrase(s) "means for" or "step for," respectively.

We claim:

1. A method comprising:

providing a lens having a curved surface, a lens axis, and a radius; and rotating both the lens and a polarizing liquid about a rotation axis such that the polarizing liquid flows onto and over at least a portion of the curved surface;

the rotation axis being offset from the lens axis by a distance that is equal to or greater than the radius of the lens.

2. The method of claim 1, where the curved surface has not been treated to create an orientation prior to the rotating.

3. The method of claim 1, where the portion is coated with a material prior to the rotating.

4. The method of claim 3, where the material is an adhesion primer layer.

5. The method of claim 4, where the adhesion primer layer comprises a coupling agent.

6. The method of claim 1, where the curved surface is a convex surface, and the lens has a concave surface substantially opposite the convex surface.

7. The method of claim 6, further comprising:

placing the lens in a notch positioned in a plate having the rotation axis.

8. The method of claim 6, where a polarized coating is formed after the rotating, and the method further comprises:

adjusting a dye in the polarizing liquid to customize a color of the polarized coating.

9. The method of claim 7, further comprising:

placing the polarizing liquid on the plate; and the rotating comprising rotating the lens about the rotation axis by rotating the plate such that the polarizing liquid flows over at least the portion of the curved surface.

10. The method of claim 9, where the portion comprises the entire curved surface.

11. A method comprising:

depositing a polarizing liquid on a lens having a curved surface, a lens axis, and a radius; and rotating the lens about a rotation axis such that the polarizing liquid flows over at least a portion of the curved surface;

the rotation axis being offset from the lens axis by a distance that is equal to or greater than the radius of the lens.

12. The method of claim 11, where the depositing is achieved by dip coating.

13. The method of claim 11, where the depositing is achieved by spray coating.

14. The method of claim 11, where the depositing is achieved by flow coating.

15. The method of claim 11, further comprising:

rotating the lens about the lens axis during the depositing of the polarizing liquid.

16. The method of claim 11, where the curved surface has not been treated to create an orientation prior to the rotating.

17. The method of claim 11, where the portion is coated with a material prior to the rotating.

18. The method of claim 17, where the material is an adhesion primer layer.

19. The method of claim 18, where the adhesion primer layer comprises a coupling agent.

20. The method of claim 11, where the curved surface is a convex surface, and the lens has a concave surface substantially opposite the convex surface.

21. The method of claim 20, further comprising: placing the lens in a notch positioned in a plate having the rotation axis.

22. The method of claim 20, where a polarized coating is formed after the rotating, and the method further comprises:

adjusting a dye in the polarizing liquid to customize a color of the polarized coating.

* * * * *